(12) United States Patent
Alsewailem

(10) Patent No.: US 9,630,355 B2
(45) Date of Patent: Apr. 25, 2017

(54) BATCH MIXER WITH PLUNGER

(75) Inventor: Fares D. Alsewailem, Riyadh (SA)

(73) Assignee: KING ABDULAZIZ CITY FOR SCIENCE AND TECHNOLOGY, Riyadh (SA)

(*) Notice: Subject to any disclaimer, the term of this patent is extended or adjusted under 35 U.S.C. 154(b) by 780 days.

(21) Appl. No.: 13/307,623

(22) Filed: Nov. 30, 2011

(65) Prior Publication Data
US 2013/0134619 A1 May 30, 2013

(51) Int. Cl.
*B29C 47/10* (2006.01)
*B29B 7/26* (2006.01)
(Continued)

(52) U.S. Cl.
CPC ............ *B29C 47/385* (2013.01); *B01F 3/04* (2013.01); *B01F 3/0803* (2013.01); *B01F 3/1207* (2013.01); *B01F 3/18* (2013.01); *B01F 7/0025* (2013.01); *B01F 7/16* (2013.01); *B01F 7/161* (2013.01); *B01F 7/18* (2013.01); *B01F 15/00032* (2013.01); *B01F 15/0279* (2013.01); *B29B 7/005* (2013.01); *B29B 7/16* (2013.01); *B29B 7/26* (2013.01); *B29B 7/803* (2013.01); *B29C 47/0009* (2013.01); *B29C 47/10* (2013.01); *B29C 47/12* (2013.01); *B29C 47/54* (2013.01); *B29C 47/60* (2013.01); *B01F 7/1615* (2013.01); *B01F 2215/0049* (2013.01); *B29B 7/14* (2013.01); *B29C 47/1009* (2013.01); *B29C 47/1027* (2013.01); *B29C 47/1045* (2013.01);
(Continued)

(58) Field of Classification Search
CPC .. B29B 7/005; B29B 7/14; B29B 7/26; B29B 7/16; B29B 7/803; B29C 47/1009; B29C 47/10; B29C 47/1027; B29C 47/1063; B29C 47/1072; B29C 47/12; B29C 47/385; B29C 47/54; B29C 47/60; B29C 47/1045; B01F 7/1615; B01F 7/18; B01F 15/0279; B01F 7/0025; B01F 3/04; B01F 7/16; B01F 2215/0049; B01F 3/18; B01F 3/1207; B01F 3/0803; B01F 15/00032; B01F 7/161; B29K 2105/16; B29L 2031/00; B29L 2031/772
USPC ....... 425/207, 208, 209, 197, 183, 185, 190; 366/77
See application file for complete search history.

(56) References Cited

U.S. PATENT DOCUMENTS 3,140,078 A * 7/1964 Grubb ................ B01F 11/0082
222/136
3,188,057 A * 6/1965 Trumbull ............ B01F 11/0054
222/229
(Continued)

OTHER PUBLICATIONS

Final Office Action dated Mar. 31, 2016 in related U.S. Appl. No. 14/789,106, 10 pages.
(Continued)

*Primary Examiner* — Seyed Masoud Malekzadeh
(74) *Attorney, Agent, or Firm* — Andrew M. Calderon; Roberts Mlotkowski Safran Cole & Calderon P.C.

(57) ABSTRACT

A batch mixer is equipped with a plunger for pushing material from the batch mixer. The batch mixer includes a mixer tank structured to accommodate material. The mixer further includes a mixer head comprising at least one blade structured to blend the material within the mixer tank. The mixer further includes a plunger mechanism structured to push the blended material directly from the mixer tank.

20 Claims, 5 Drawing Sheets

(51) Int. Cl.

| | |
|---|---|
| *B01F 7/16* | (2006.01) |
| *B01F 15/02* | (2006.01) |
| *B29C 47/38* | (2006.01) |
| *B29B 7/16* | (2006.01) |
| *B01F 7/18* | (2006.01) |
| *B29C 47/00* | (2006.01) |
| *B01F 3/04* | (2006.01) |
| *B01F 3/08* | (2006.01) |
| *B01F 3/12* | (2006.01) |
| *B01F 3/18* | (2006.01) |
| *B01F 7/00* | (2006.01) |
| *B01F 15/00* | (2006.01) |
| *B29B 7/00* | (2006.01) |
| *B29B 7/80* | (2006.01) |
| *B29C 47/12* | (2006.01) |
| *B29C 47/54* | (2006.01) |
| *B29C 47/60* | (2006.01) |
| *B29B 7/14* | (2006.01) |
| *B29K 105/16* | (2006.01) |
| *B29K 101/00* | (2006.01) |
| *B29L 31/00* | (2006.01) |

(52) U.S. Cl.
CPC ...... *B29C 47/1063* (2013.01); *B29C 47/1072* (2013.01); *B29K 2101/00* (2013.01); *B29K 2105/16* (2013.01); *B29L 2031/00* (2013.01); *B29L 2031/772* (2013.01)

(56) References Cited

U.S. PATENT DOCUMENTS

| | | | | |
|---|---|---|---|---|
| 3,308,994 | A * | 3/1967 | Rohn | 222/245 |
| 3,475,010 | A * | 10/1969 | Moline et al. | 366/333 |
| 3,606,094 | A * | 9/1971 | Mills et al. | A61C 9/0026 |
| | | | | 222/145.6 |
| 3,800,597 | A * | 4/1974 | Paul et al. | 73/54.32 |
| 4,464,056 | A * | 8/1984 | Schmitz et al. | 366/134 |
| 4,889,432 | A * | 12/1989 | Patterson | A61C 5/064 |
| | | | | 222/388 |
| 4,910,237 | A * | 3/1990 | Peter | 523/351 |
| 4,919,849 | A * | 4/1990 | Litz et al. | 261/36.1 |
| 5,071,040 | A * | 12/1991 | Laptewicz, Jr. | A61B 17/00491 |
| | | | | 222/235 |
| 5,842,785 | A * | 12/1998 | Brown | A61B 17/8825 |
| | | | | 366/139 |
| 5,865,535 | A * | 2/1999 | Edwards | 366/76.7 |
| 5,951,160 | A * | 9/1999 | Ronk | 366/130 |
| 6,293,693 | B1 * | 9/2001 | Rodgers | B01F 3/10 |
| | | | | 366/189 |
| 6,413,455 | B1 * | 7/2002 | Yates | 264/51 |
| 6,488,651 | B1 * | 12/2002 | Morris et al. | 604/89 |
| 6,592,247 | B1 * | 7/2003 | Brown | A61B 17/8825 |
| | | | | 366/139 |
| 6,811,295 | B2 * | 11/2004 | Koro et al. | 366/97 |
| 7,195,473 | B2 | 3/2007 | Sullivan et al. | |
| 7,524,103 | B2 * | 4/2009 | McGill et al. | 366/189 |
| 8,038,682 | B2 * | 10/2011 | McGill | A61B 17/8816 |
| | | | | 606/94 |
| 8,764,276 | B1 * | 7/2014 | Higbie et al. | 366/130 |
| 8,961,859 | B2 * | 2/2015 | Chinomi | B29B 9/065 |
| | | | | 264/118 |
| 2001/0036123 | A1 * | 11/2001 | Koro et al. | 366/84 |
| 2002/0031318 | A1 * | 3/2002 | Choi et al. | 385/124 |
| 2003/0012079 | A1 * | 1/2003 | Coffeen et al. | 366/130 |
| 2004/0146434 | A1 * | 7/2004 | Kane et al. | 422/100 |
| 2005/0105385 | A1 * | 5/2005 | McGill et al. | 366/139 |
| 2005/0128868 | A1 * | 6/2005 | Vries | 366/139 |
| 2006/0052794 | A1 * | 3/2006 | McGill | A61B 17/8816 |
| | | | | 606/93 |
| 2007/0217282 | A1 * | 9/2007 | Lidgren et al. | 366/108 |
| 2008/0253935 | A1 * | 10/2008 | Kane et al. | 422/100 |
| 2009/0012497 | A1 * | 1/2009 | Uber et al. | 604/518 |
| 2009/0238031 | A1 * | 9/2009 | Conard et al. | 366/162.2 |
| 2010/0121310 | A1 * | 5/2010 | Simonton | B01F 11/0082 |
| | | | | 604/518 |
| 2012/0041359 | A1 * | 2/2012 | Schoenle | A61M 5/31596 |
| | | | | 604/22 |

OTHER PUBLICATIONS

Final Office Action dated Apr. 7, 2016 in related U.S. Appl. No. 14/471,220, 14 pages.
Office Action dated Oct. 8, 2015 in related U.S. Appl. No. 14/471,220, 12 pages.
Office Action dated Oct. 8, 2015 in related U.S. Appl. No. 14/789,106, 8 pages.
Notice of Allowance in related U.S. Appl. No. 14/789,106, dated Jan. 17, 2017, 7 pages.
Notice of Allowance in related U.S. Appl. No. 14/471,220, dated Jan. 23, 2017, 7 pages.

* cited by examiner

BATCH MIXER WITH PLUNGER

FIELD OF THE INVENTION

The invention relates to a batch mixer and, more particularly, to a batch mixer equipped with a plunger for pushing material from the batch mixer.

BACKGROUND OF THE INVENTION

Several techniques are available to process polymers, including twin screw extruders and batch mixers. Batch mixers provide for increased residence time of polymeric materials, which improves shearing history of the polymeric materials.

Batch mixers, such as a Banbury® mixer, are known in the art of mixing polymeric materials. These batch mixers have several shortcomings, however. For example, in known batch mixers, after blending or mixing of the material is complete, the mixers are opened and the polymeric materials are manually scooped out from the mixer. This is done with the material in a molten state. This process is time consuming, expensive and complicated. When the polymeric material is solidified as a molten chunk, the polymeric material may be put in a crusher to form polymer granules. However, this form of materials cannot be pelletized.

Accordingly, there exists a need in the art to overcome the deficiencies and limitations described hereinabove.

SUMMARY OF THE INVENTION

In a first aspect of the invention, a batch mixer comprises a mixer tank structured to accommodate material. The mixer further comprises a mixer head comprising at least one blade structured to blend the material within the mixer tank. The mixer further comprises a plunger mechanism structured to push the blended material directly from the mixer tank.

In another aspect of the invention, a batch mixer comprises a mixer tank having an interior portion structured to accommodate polymeric material. The mixer further comprises a mixer structured to blend the polymeric material within the interior portion of the mixer tank. The mixer is rotatable and moveable in a vertical direction along a shaft. The mixer further comprises a plunger mechanism structured to push the blended polymeric material through a die in fluid communication with the interior portion of the mixer tank. The plunger mechanism is rotatable and moveable in the vertical direction along the shaft. The mixer further comprises a plurality of limiters structured to limit the vertical movement of the plunger mechanism and the mixer.

In yet another aspect of the invention, a method of mixing material comprises: placing material within a tank; placing a mixing head on the tank, and mixing the material within the tank with the mixing head; removing the mixing head from the tank; placing a plunger mechanism on the tank; moving the plunger mechanism within the tank to push the mixed material from a die; and removing the plunger mechanism from the tank.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

Figure 1:
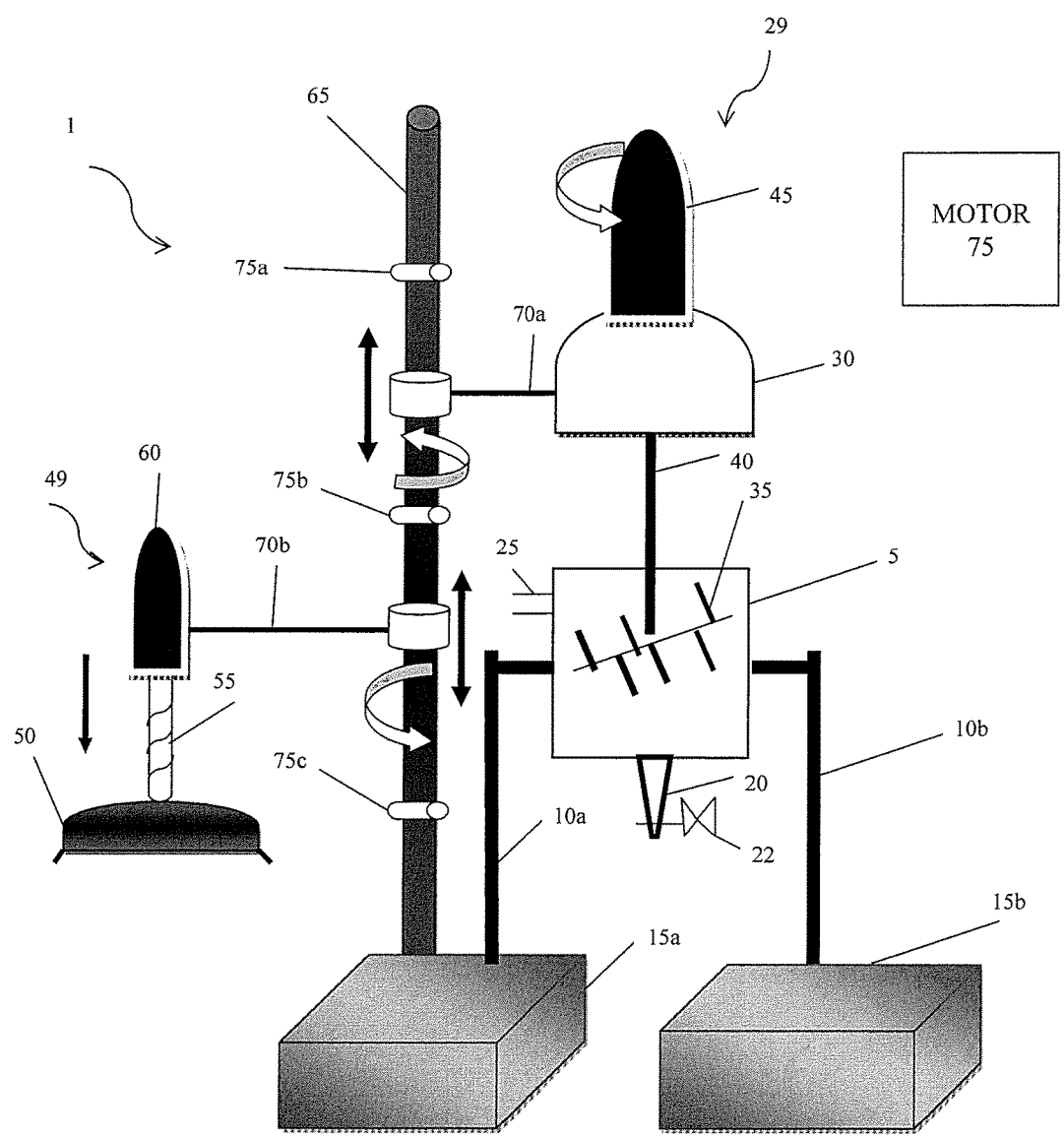
FIG. 1 shows a batch mixer according to aspects of the present invention.

The invention relates to a batch mixer and, more particularly, to a batch mixer equipped with a plunger for pushing material from the batch mixer. More specifically, in embodiments, the batch mixer includes a plunger mechanism to push material through a die of a mixer tank. Advantageously, the present invention provides for semi-continuous operation while controlling the residence time of a mixing and compounding process of, e.g., polymeric materials. Accordingly, polymeric materials may be easily and efficiently discharged from the batch mixer and fabricated into desired pellet shapes. As such, the present invention provides for a more cost-effective removal of polymeric materials from the batch mixer.

In the area of polymer processing, mixing and blending, whether in solution or molten form, of different polymers with each other and blending them with organic and/or inorganic fillers and additives is important. The quality of mixing, blending, and compounding of polymeric materials, e.g., plastics, determines the properties of the final product. The benefit of using batch mixers over conventional systems, e.g., twin screw extruders, is that the residence time is higher in batch mixers such that shearing history of the polymeric material is considerably improved.

Advantageously, the batch mixer of the present invention is capable of pushing material, e.g., polymeric material or food products, from the batch mixer, using a plunger mechanism. This avoids the shortcomings of known mixers, which require the user to open the mixer and manually scoop out the material, e.g., polymeric material, from the mixer, in a molten state (which is a time consuming and costly process). Thus, compared to conventional systems, in the batch mixer of the present invention, processed material, e.g., polymeric material or food products, may be easily and efficiently drawn out of the mixer and fabricated to a desired shape using a plunger and die system. Also, advantageously, the material exiting from the die may automatically be guided through a water bath to a pelletizer to obtain material in pellet form. The batch mixer is also equipped with an opening to introduce inert or purging gas into the batch mixer and/or to suck air out of the batch mixer, thus allowing the batch mixer to operate under vacuum.

In embodiments, the material may be related to the research and development of food products. Many food products undergo a mixing process in order to achieve characteristics such as texture, homogeneity, composition and temperature. In embodiments, food mixing can include nano-emulsions, large particle suspensions, highly viscous pastes, or dry powders, with or without the incorporation of gas. In embodiments, the mixing may be: solid-solid mixing, such as powders or textural effects; liquid-solid mixing, such as butters, pastes and dough; liquid-liquid mixing, such as emulsions, margarines, and spreads; or gas-liquid mixing, such as fermentation or chlorination. Accordingly, mixing and blending of food products with additives, flavorings, texture, and other fillers is provided herein. In embodiments, the production of food pellets and flakes such as cereals, pastas, and candies require longer mixing times. As such, the present invention may be of great help to food research and development and food product mixing.

FIG. 1 shows a batch mixer according to aspects of the present invention. More specifically, FIG. 1 shows a batch mixer 1 having mixer tank 5 supported on support bases 15a, 15b by support bars 10a, 10b, respectively. It should be understood by those of skill in the art that any number of support bars and support bases are contemplated by the present invention. In embodiments, the mixer tank 5 has a diameter of about 10 cm and a height of about 20 cm; although other dimensions are contemplated by the present invention. The mixer tank 5 includes an interior portion that accommodates material, e.g., mixing, blending, and compounding, whether in solution or molten form, different polymers with each other and blending them with organic and/or inorganic fillers and additives.

The mixer tank 5 also includes a die 20 in fluid communication with the interior portion. The die 20 is structured to discharge materials from the interior portion of the mixer tank 5, as discussed below. A valve 22 is provided for controlling the flow rate of the material being discharged through the die 20. In embodiments, the die 20 can be customized to any desired shape such as a slit, annular, etc.

In embodiments, the mixer tank 5 further includes an opening 25 (e.g., pipe in fluid communication with an interior of the mixer tank) which can be used to introduce an inert or purging gas into the mixer tank 5 to prevent undesired chemical reactions from taking place within the mixer tank 5. In alternate embodiments, the opening 25 is used to remove air or other gases from the mixer tank 5, thus creating a vacuum.

As further shown in FIG. 1, the batch mixer 1 includes a mixer head 29. The mixer head 29 includes a cover 30, and one or more mixer blades 35 which are operable by a high-torque motor 45. In embodiments, the high-torque motor 45 is connected to the one or more mixer blades 35 by a shaft 40, in order to rotate the one or more mixer blades 35. In this way, the high-torque motor 45 drives the shaft 40 thereby causing the one or more mixer blades 35 to mix and blend the materials, e.g., molten polymer blends and compounds or food products, within the mixer tank 5. The one or more mixer blades 35 may be of different shapes and designs to ensure well mixed and/or blended materials. For example, the one or more mixer blades 35 can be paddle blades. In embodiments, the mixer blades 35 can also be gyrated in a rotational or partial rotational manner, as well as configurations which act as a vertical chopping.

Still referring to FIG. 1, the batch mixer 1 further includes a plunger head 49. The plunger head 49 includes a plunger 50 attached to a screw driven shaft 55. In embodiments, the screw driven shaft 55 is connected to a motor 60 in order to lower and raise the plunger 50, when in the mixer tank 5. In this way, in operation, the plunger 50 can discharge materials from the mixer tank 5, through the die 20. The plunger 50 is preferably made of stiff and thermal stable materials capable of withstanding temperatures up to about 300° C., while being able to push molten materials through the die 20.

In embodiments, the mixer head 29 and plunger head 49 are rotatably attached to a shaft 65 using an arm 70a and an arm 70b, respectively. Specifically, the mixer head 29 is connected to and spaced from the shaft 65 by the arm 70a extending between the shaft 65 and the mixer head 29, and the plunger head 49 is connected to and spaced from the shaft 65 by the arm 70b extending between the shaft 65 and the plunger head 49. In embodiments, the arms 70a, 70b are rotated manually; however, in alternate embodiments, the arms 70a, 70b can be rotated automatically using a motor 75. In further embodiments, the mixer head 29 and plunger head 49 move vertically along the shaft 65. Similar to the rotational movement of the arms 70a, 70b, in embodiments, the vertical movement of the arms 70a, 70b may be performed either manually or automatically. The vertical movement of the arms 70a, 70b is limited by the pins 75a-75c (e.g., mechanical structures or limiters). The pins 75a-75c can also lock the arms 70a, 70b to the shaft 65 at certain operational positions. In alternate embodiments, other pins or other locking mechanisms are contemplated by the present invention.

More specifically, the pins 75a and 75b limit the movement of the mixer head 29, in the vertical direction; whereas, the pins 75b and 75c limit the movement of the plunger head 49, in the vertical direction. In embodiments, the pins 75a-75c can also lock the mixer head 29 and plunger head 49 at certain operational positions along the shaft 65. In particular, the pin 75a can lock the mixer head 29 in the raised position, and the pin 75b can lock the mixer head 29 in a lower position (i.e., when the mixer head 29 is sealed to the mixer tank 5). Similarly, the pin 75c can lock the plunger head 49 in the lower position, and the pin 75b can lock the plunger head 49 in a raised position (i.e., when the plunger head 49 is sealed to the mixer tank 5). As one of skill in the art should recognize, in embodiments, the plunger head 49 is located in the raised position (sealed to the mixer tank 5), while the mixer head 29 is in the raised position (outside of and remote from the mixer tank); whereas the mixer head 29 is in the lowered position (sealed to the mixer tank 5), while the plunger head 49 is in the lowered position (outside of and remote from the mixer tank). It should be understood by those of skill in the art, that the plunger head 49 and the mixer head 29 can also be arranged vice versa, depending on the configuration of the batch mixer, e.g., the plunger head 49 can be arranged above the mixer head 29. Thus, the mixer head 29 and the plunger head 49 are configured to be interchangeably received within an inlet of the mixer tank 5.

Figure 2:
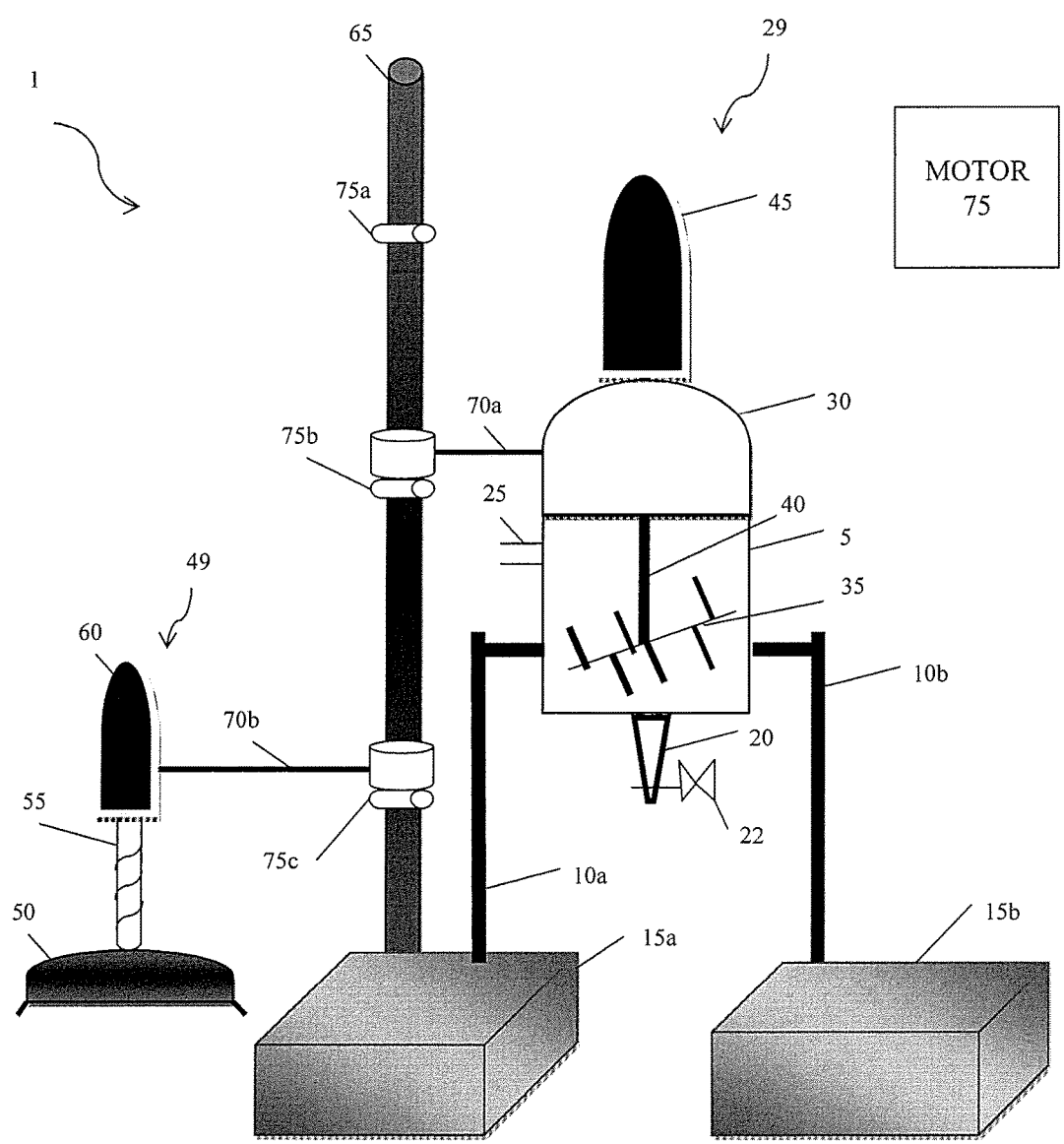
FIG. 2 shows the batch mixer with a mixer head on a mixer tank according to aspects of the present invention.

FIG. 2 shows the batch mixer with the mixer head sealed on the mixer tank according to aspects of the present invention. More specifically, in FIG. 2, the cover 30 is placed on the mixer tank 5 with the one or more mixer blades 35 inserted in the mixing tank 5. In this operational position, the arm 70a is locked onto the shaft 65 by the pin 75b, and the mixer blades 35 are moved (e.g., rotated) by the high-torque motor 45. FIG. 2 further shows the plunger head 49 in the lowered position, with the arm 70b, in embodiments, locked to the shaft 65 by the pin 75c. Alternatively, the arm 70b can rest on the pin 75c.

Figure 3:
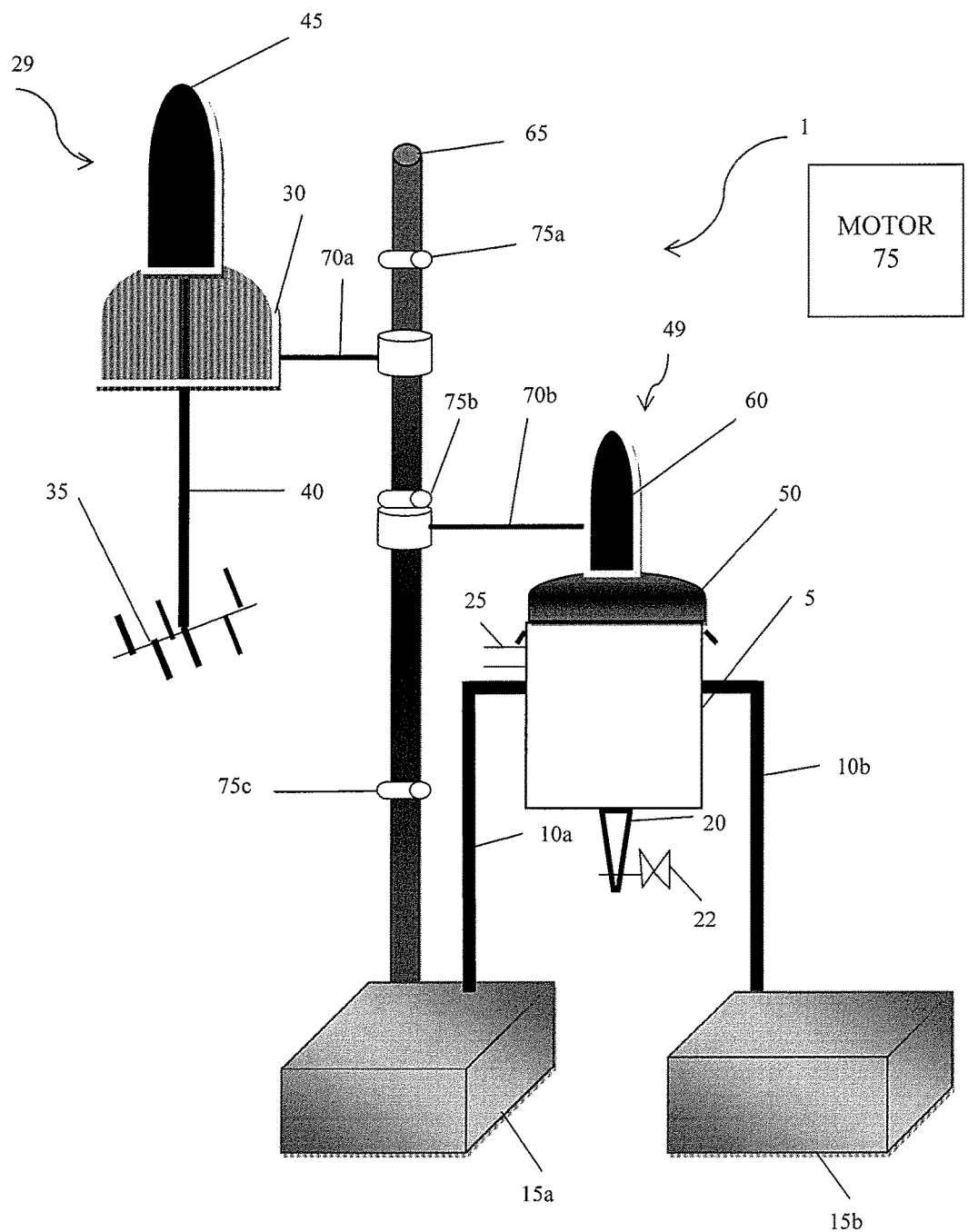
FIG. 3 shows the batch mixer with a plunger head on the mixer tank according to aspects of the present invention.

FIG. 3 shows the batch mixer with the plunger head sealed on the mixer tank according to aspects of the present invention. More specifically, in FIG. 3, the plunger head 49 is in the raised position, sealed on the mixer tank 5. In this operational position, the arm 70b is in the raised position, and locked to the shaft 65 by the pin 75b. Also, in this operational position, after the materials in the mixer tank 5 have had a sufficiently high residence time within the mixer tank 5, the plunger 50 will begin to discharge the material through the die 20 of the mixer tank 5. The flow rate of the material can be based on the valve setting 22, as well as the force applied by the plunger 50. As should be understood by those of skill in the art, the residence time of the materials will vary in accordance with the nature of the blending and compounding process.

Figure 4:
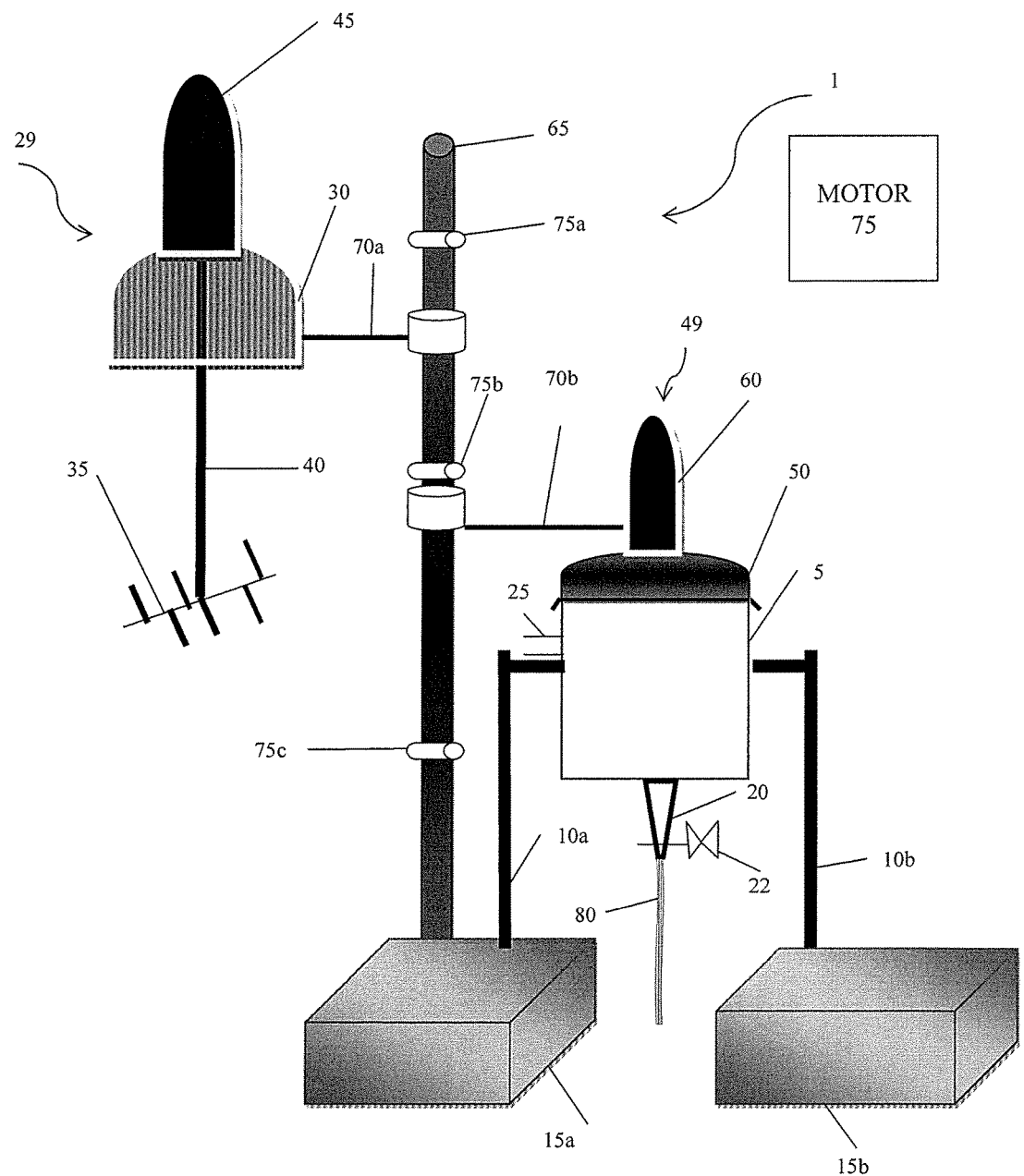
FIG. 4 shows material being pushed from the batch mixer according to aspects of the present invention.

FIG. 4 shows material being pushed from the batch mixer according to aspects of the present invention. In this operational stage of FIG. 4, the motor 60 will supply power to the plunger 50 in order to push material through the die 20. More specifically, in embodiments, the plunger 50 is sealed on the mixer tank 5 and the motor 60 supplies power to the screw driven shaft 55 to lower the plunger 50 within the mixer tank 5. In this way, the plunger 50 forces material 80 through the die 20 of the mixer tank 5. In embodiments, the plunger 50 is a screw type plunger; however, it should be understood by those of skill in the art that other types of plungers are contemplated by the present invention.

Figure 5:
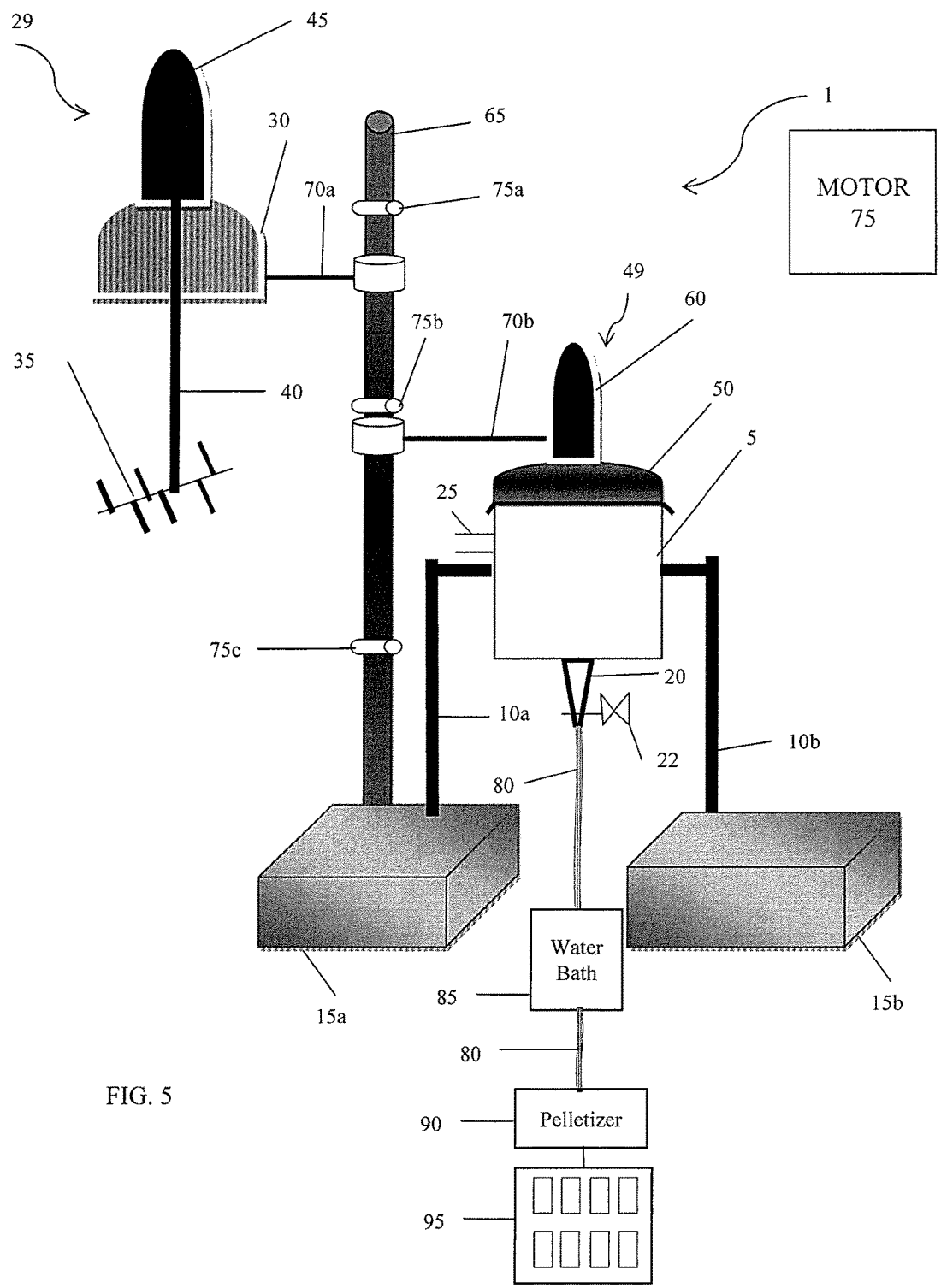
FIG. 5 shows material being formed into pellets according to aspects of the present invention.

FIG. 5 shows material 80 being discharged from the die 20 of the mixer tank 5 and guided through a water bath 85. The water bath 85 is used to maintain a stable temperature of the material 80. FIG. 5 further shows the material 80 guided through a pelletizer 90, which produces pellets 95 of different sizes and with different mechanical properties depending on the desired pellet type. In embodiments, the pelletizer 90 uses both mechanical force and thermal processes to produce the desired pellet properties. As a result, the discharged material 80 is transformed into pellets 95.

As thus should now be understood, a method of mixing and blending material, e.g., polymeric material and/or food products, can be achieved with the batch mixer of the present invention. For example, material is placed within the mixer tank 5, and the mixing head 29 is placed on the mixer tank 5. The mixing head 29 is activated, and more specifically, the one or more mixer blades begin to mix the material within the mixing tank 5. Once a desired residence time is achieved, the mixing head 29 is removed from the mixing tank 5. For example, the mixing head 29 can be lifted in a vertical direction, and rotated away from the mixing tank. The mixing head 29 can be locked into place by a pin or other equivalent locking mechanism. Thereafter, the plunger head 49 is placed on the mixing tank, by moving it in the vertical direction and rotating it to align with the mixing tank 5. The plunger mechanism, e.g., screw plunger, is activated in order to discharge the mixed material from the die 20. The valve 22 can be adjusted in order to adjust the flow rate of the mixed material. The plunger mechanism can then be removed from the mixing tank 5.

The foregoing examples have been provided for the purpose of explanation and should not be construed as limiting the present invention. While the present invention has been described with reference to an exemplary embodiment, changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. A batch mixer, comprising:
    a mixer tank structured to accommodate material and defining an inlet;
    a mixer head connected to and spaced from a shaft by a first arm extending between the shaft and the mixer head, the mixer head comprising at least one blade structured to blend the material within the mixer tank; and
    a plunger mechanism connected to and spaced from the shaft by a second arm extending between the shaft and the plunger mechanism, the plunger mechanism structured to push the blended material directly from the mixer tank,
    wherein the mixer head and the plunger mechanism are configured to be interchangeably received within said inlet, such that the mixer head is positioned outside of and remote from the mixer tank when the plunger mechanism is positioned in the mixer tank and the plunger mechanism is positioned outside of and remote from the mixer tank when the mixer head is positioned in the mixer tank.

2. The batch mixer of claim 1, wherein the at least one blade is a plurality of blades comprising paddle blades.

3. The batch mixer of claim 1, wherein the plunger mechanism is a screw type mechanism.

4. The batch mixer of claim 1, wherein:
    the mixer head is rotatable and moveable in a vertical direction; and
    the plunger mechanism is rotatable and moveable in the vertical direction.

5. The batch mixer of claim 4, wherein the vertical movement of the mixer head is limited by a first pin positioned on the shaft and a second pin positioned on the shaft, and the vertical movement of the plunger mechanism is limited by a third pin positioned on the shaft and the second pin positioned on the shaft.

6. The batch mixer of claim 4, wherein the mixer head and the plunger mechanism are locked in different positions by a respective pin.

7. The batch mixer of claim 4, wherein the mixer head and the plunger mechanism are moveable along the common shaft.

8. The batch mixer of claim 1, further comprising:
    a die in fluid communication with an interior portion of the mixer tank, wherein the blended material is discharged through the die;
    a valve structured to adjust a flow rate of the blended material from the die; and
    an opening in fluid communication with the mixer tank structured to receive purge gases or provide a vacuum in the mixer tank.

9. A batch mixer, comprising:
    a mixer tank structured to accommodate material;
    a mixer head connected to and spaced from a shaft by a first arm extending between the shaft and the mixer head, the mixer head comprising at least one blade structured to blend the material within the mixer tank;
    a plunger mechanism connected to and spaced from the shaft by a second arm extending between the shaft and the plunger mechanism, the plunger mechanism structured to push the blended material directly from the mixer tank;
    a water bath downstream of the mixer tank; and
    a pelletizer downstream from the mixer tank configured to transform the blended material discharged from the mixer tank into pellets.

10. The batch mixer of claim 1, wherein the blended material is a polymeric material.

11. The batch mixer of claim 1, wherein the blended material is a food product.

12. The batch mixer of claim 1, wherein:
    the mixer head is rotatably attached to the shaft by the first arm; and
    the plunger mechanism is rotatably attached to the shaft by the second arm.

13. The batch mixer of claim 12, wherein the first arm and the second arm are each rotatable about the shaft and vertically moveable along the shaft.

14. The batch mixer of claim 13, further comprising:
a first mechanical structure on the shaft;
a second mechanical structure on the shaft; and
a third mechanical structure on the shaft.

15. The batch mixer of claim 14, wherein:
the first arm is attached to the shaft between the first mechanical structure and the second mechanical structure; and
the second arm is attached to the shaft between the second mechanical structure and the third mechanical structure.

16. The batch mixer of claim 14, wherein:
the first mechanical structure and the second mechanical structure define limits of vertical movement of the first arm along the shaft; and
the second mechanical structure and the third mechanical structure define limits of vertical movement of the second arm along the shaft.

17. The batch mixer of claim 14, wherein:
the second mechanical structure locks the first arm to the shaft when the mixer head is in the mixer tank and the plunger mechanism is remote from the mixer tank; and
the second mechanical structure locks the second arm to the shaft when the plunger mechanism is in the mixer tank and the mixer head is remote from the mixer tank.

18. The batch mixer of claim 14, wherein the mixer head is completely outside the mixer tank when the plunger mechanism is sealed on the mixer tank.

19. The batch mixer of claim 1, wherein the mixer head is completely outside the mixer tank when the plunger mechanism is sealed on the mixer tank.

20. The batch mixer of claim 9, wherein the mixer head is completely outside the mixer tank when the plunger mechanism is sealed on the mixer tank.

* * * * *